No. 818,966. PATENTED APR. 24, 1906.
F. E. IVES.
DIFFRACTION GRATING REPLICA.
APPLICATION FILED SEPT. 29, 1905.

Witnesses:
Hamilton D. Turner
Titus Helrods

Inventor
Frederic E. Ives.
by his Attorneys,
Howson & Howson

UNITED STATES PATENT OFFICE.

FREDERIC E. IVES, OF WOODCLIFFE-ON-THE-HUDSON, NEW JERSEY.

DIFFRACTION-GRATING REPLICA.

No. 818,966. Specification of Letters Patent. Patented April 24, 1906.

Application filed September 29, 1905. Serial No. 280,693.

*To all whom it may concern:*

Be it known that I, FREDERIC E. IVES, a citizen of the United States, residing at Woodcliffe-on-the-Hudson, Weehawken post-office, New Jersey, have invented certain Improvements in Diffraction-Grating Replicas, of which the following is a specification.

The object of my invention is to make a replica of a diffraction-grating which will be of better optical quality than those produced by the methods heretofore practiced. This object I attain in the manner hereinafter set forth, reference being had to the accompanying drawings, in which—

Figure 1:
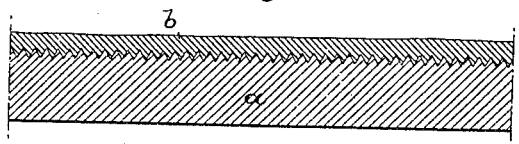
Figure 2:
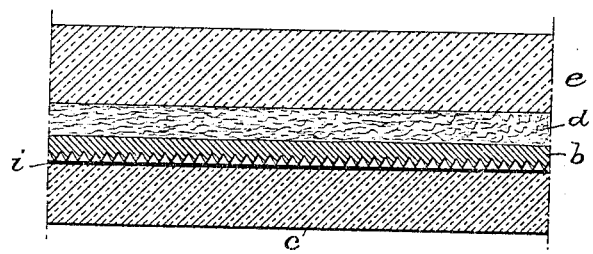
Figure 3:
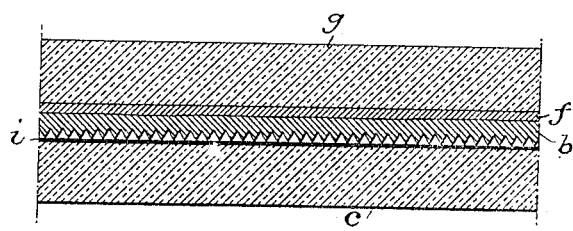

Figure 1 is a sectional view, on an enlarged scale, illustrating the first stage of my improved process of making a diffraction-grating replica. Fig. 2 is a similar view illustrating the second stage of the process, and Fig. 3 is a similar view showing the completed replica.

Heretofore the most successful method of producing replicas of a diffraction-grating consisted in properly leveling the original grating and pouring upon it a solution of celluloid in amyl-acetate or similar solvent, permitting the film thus formed to dry, and then placing the grating, with its superposed film, in water until the film loosened and then removing the film and laying it, under water, upon a piece of plane glass, with the ruled surface outward, the film being then permitted to dry in contact with the glass. This method is subject, among others, to the following objections: first, irregularities in the thickness of the film distort the plane of the diffracting-surface, and although this distortion may be very slight it is optically of considerable importance; second, the thin celluloid film is very tender and elastic and probably always distorts in handling or shrinks unevenly in drying sufficiently to injure the definition of the spectra; third, the delicate surface of the cast is exposed to injury, or, if covered with a protecting-glass, reflections between the surface of the grating-replica and the cover-glass impair the performance of the grating in the spectroscope. In carrying out my invention I substitute a harder and less elastic material for the celluloid, dry out the solvent more thoroughly than is necessary when the cast is placed upon a glass plate with its face outward, place the cast face downward on the plane glass, and seal the cast under another plane glass by the use of a material or compound having approximately the same refractive index as the film-cast.

For an original from which to make the replica I prefer a Rowland grating on speculum metal. This is leveled face up—as shown, for instance, at $a$ in Fig. 1—and said face is then covered with a thick solution of soluble guncotton in amyl acetate. When apparently dry, it may be subjected to gentle heat until no odor of the solvent is any longer perceptible, and after it has cooled to the temperature of the room the grating, bearing the film-cast $b$, is immersed in a tray of filtered water alongside of a clean plane glass. After a few minutes' soaking the edge of the film is loosened by a suitable implement, and the film is then pulled from the grating by forceps and drawn over the glass plate, which is then lifted out of the water, with the film-cast resting upon it with its incised side down. By means of gentle pressure with a photographic-print roller or other suitable implement the cast is then brought into uniform contact with the glass plate and is then covered with a pad of absorbent paper or other suitable material $d$, Fig. 2, upon which is laid another plane glass $e$ and a suitable weight, for the purpose of permitting the film to dry under pressure.

The drawings are merely diagrammatic, not representing the relative thickness of the elements.

After removing the wet absorbent pad the film is exposed to air or gently heated to drive off the last traces of moisture, after which it is ready for sealing up with the cover-glass.

Spirits of turpentine has a lower refractive index than the film-cast, and Canada balsam has a higher refractive index. Dry Canada balsam may, therefore, be dissolved in spirits of turpentine in such relative proportions as to produce a sealing compound having almost exactly the same refractive index as the film-cast, or boiled linseed-oil may be substituted for the spirits of turpentine and liquid Canada balsam for dry Canada balsam. A proper quantity of this solution is poured over the back of the film-cast, the cover-glass $g$ is applied, and the surplus solution pressed out, so as to form between the film-cast and the cover-plate a thin film $f$, which serves to unite said film-cast and cover-plate. (See Fig. 3.) The edges may then be cleaned off and suitably bound in order to finish the replica ready for use in the spectroscope.

By applying the film-cast with its incised face in direct contact with the plane glass the plane of the diffracting-surface is preserved, and the fine scored lines, after drying, are left as air-spaces between the film and the glass, and by sealing the film-cast between two plane glass plates by the use of a cementing agent having approximately the same refractive index as the film-cast any optical defect due to irregularity in the thickness of the film-cast is eliminated and at the same time the cast is protected from liability to injury.

If the grating is intended to be used by transmitted light, a clear-glass plate $c$ will be used; but if the grating is to be employed with reflected light a plate $c$, having a silvered surface—such, for instance, as represented at $i$ in Fig. 3—will be employed.

Having thus described my invention, I claim and desire to secure by Letters Patent—

1. A diffraction-grating replica consisting of a film-cast and a supporting-plate upon which said cast is mounted with the incised face of the cast next to the face of the plate.

2. A diffraction-grating replica consisting of a film-cast, a supporting-plate against which the incised face of the cast bears, a cover-plate on the back of the cast, and a securing agent therefor having substantially the same refractive index as the film-cast.

3. A diffraction-grating replica consisting of a film-cast, and a silvered supporting-plate in contact with the incised face of the cast.

4. A diffraction-grating replica for spectroscopic work, said replica consisting of a film-cast with incised face composed of ribs whose tops are in a true plane.

5. A diffraction-grating replica for spectroscopic work, said replica consisting of a film-cast with incised face composed of ribs whose tops are in a true plane, and a backing-plate with plane surface against which the back of the cast is cemented.

6. The combination of a diffraction-grating replica with plates between which said replica is sealed.

In testimony whereof I have signed my name to this specification in the presence of two subscribing witnesses.

FREDERIC E. IVES.

Witnesses:
HERBERT E. IVES,
HERBERT I. PRENTICE.